United States Patent [19]

Gunning et al.

[11] 4,137,380

[45] Jan. 30, 1979

[54] POLYESTER GRANULES AND PROCESS

[75] Inventors: Raymond H. Gunning, Box Hill North; Bruce C. Henshaw, Mount Waverley; Frederick J. Lubbock, Beaumaris, all of Australia

[73] Assignee: Dulux Australia Ltd., Melbourne, Australia

[21] Appl. No.: 535,711

[22] Filed: Dec. 17, 1974

Related U.S. Application Data

[62] Division of Ser. No. 409,454, Oct. 25, 1973, Pat. No. 3,879,314.

[30] Foreign Application Priority Data

Nov. 13, 1972 [AU] Australia ............................ PB1202

[51] Int. Cl.$^2$ .............................................. C08J 9/28
[52] U.S. Cl. ...................................... 521/62; 521/63; 521/69; 521/88; 521/117; 521/138; 521/140
[58] Field of Search .................... 260/2.5 N, 29.6 NR
[56] References Cited

U.S. PATENT DOCUMENTS

| Re. 27,444 | 2/1972 | Will | 260/2.5 N |
|---|---|---|---|
| 3,244,772 | 4/1966 | Von Bonin et al. | 260/2.5 N |
| 3,255,127 | 6/1966 | Von Bonin et al. | 260/2.5 N |
| 3,442,842 | 5/1969 | Von Bonin | 260/2.5 N |
| 3,666,697 | 5/1972 | Peloza | 260/2.5 N |
| 3,669,911 | 6/1972 | Najvar | 260/2.5 N |
| 3,740,255 | 6/1973 | Fox | 260/2.5 N |
| 3,740,353 | 6/1973 | Patrick et al. | 260/2.5 N |

FOREIGN PATENT DOCUMENTS

| 856861 | 11/1970 | Canada | 260/2.5 N |
|---|---|---|---|
| 877357 | 8/1971 | Canada | 260/2.5 N |

*Primary Examiner*—Morton Foelak
*Attorney, Agent, or Firm*—Cushman, Darby & Cushman

[57] ABSTRACT

Aqueous slurries of vesiculated cross-linked polyester resin granules which show a shrinkage of less than 5% on drying are prepared by a double-emulsion process in the presence of polyamine having a pKa value of 8.5–10.5 at a concentration of 0.3 to 1.4 amine groups per carboxyl group of the polyester, the acid value of which is limited to 10–45 mgm KOH per gm.

The granules are of particular use as opacifying matting agents in latex paints and avoid the defect observed hitherto of cracking at high film builds.

7 Claims, No Drawings

POLYESTER GRANULES AND PROCESS

This is a division of application Ser. No. 409,454, filed Oct. 25, 1973, now U.S. Pat. No. 3,879,314.

This invention relates to aqueous slurries of vesiculated polyester resin granules, to a process of preparing them and to paints comprising such slurries.

It has been proposed that granules of vesiculated polymer with diameters of the order of 0.5 to 500 microns be used in paints as matting or texturing agents. By "vesiculated" granules we mean granules of polymer which comprise a plurality of internal cells or vesicles. Ideally, each vesicle is formed as a discrete entity within a mass of non-porous polymer; that is, the polymer granule does not have a continuous porosity extended from one cell to another, but comprises a plurality of discrete isolated vesicles surrounded by a continuous wall of polymer. They may be present a minor proportion of imperfect vesicles in which some of the polymer defining the wall of the vesicle has either not formed or has been broken away, allowing entry from one vesicle to its neighbour. Thus, it is a characteristic feature of granules having a vesiculated structure that while they may well be vapour-permeable, they are not normally permeable to liquids.

It has further been proposed that if vesiculated polymer granules in which the vesicles are vapour-filled are incorporated in a paint composition, they can, unlike "extender" pigments used hitherto as flatting agents in paint, contribute opacity to a dry film of the paint by reason of their vesiculated structure. In order to do this effectively it has been proposed that the granule diameter should be at least five times the mean vesicle diameter. Further gains in opacity may be made by pigmenting the granules. By pigmented granules we mean polymer granules in which pigment has been dispersed throughout the polymer of which the granules are constituted. Alternatively, pigment particles may be incorporated within the vesicles of the granules and this use of pigment may be accompanied by some pigmenting of the polymer of the granules as well.

It is often found desirable, especially when the vesiculated granules are intended for use in aqueous latex paints, to prepare them by a polymerisation process that yields what is essentially a slurry of vesiculated granules in water. The granules are then incorporated directly in the intended aqueous composition without the need for an intermediate drying process. For example, particles of water may be suspended in a solution in styrene of a carboxylated unsaturated polyester resin which in turn is suspended as discrete globules in water to which ammonia and a colloidal stabiliser has been added. Polymerisation and cross-linking of the polyester resin is then initiated by known means and results in the formation of vesiculated polyester resin granules. If pigment is to be incorporated in the vesicles or polymer of the granules, this may be accomplished by pre-dispersing pigment by known means in either the water which is then suspended in the styrene or the unsaturated polyester resin solution, respectively.

Unsaturated polyester resins which will co-react with a polymeriable unsaturated monomer to give a cross-linked resin are well known in the art, as are ways of initiating the polymerisation reaction. By a "carboxylated" unsaturated polyester resin we refer to the known types of polyester resin which contain unreacted carboxyl groups the concentration of which is commonly expressed in the art as the acid value of the resin. We refer herein to such acidic resins as carboxylated unsaturated polyester resins. These cross-linkable resins are particularly suitable materials from which to prepare vesiculated polymer granules, because they can readily be polymerised directly to give a granular particle and when cross-linked they are insoluble in organic liquids, a characteristic of particular importance when they are to be used in paint compositions.

Granules as prepared above are satisfactory and desirable materials for many purposes, but in some applications, for example where they are to be used as matting and opacifying agents in aqueous latex paints and especially at high granule volume concentrations, we have observed that the granules shrink appreciably as the paint dries. This shrinking in turn can lead to cracking of the dry paint film. We refer herein to such particles as "dimensionally unstable. However, if dimensionally stable granules are used, the cracking is eliminated or substantially overcome.

By dimensionally stable granules we mean granules which, when tested by the following method, have a shrinkage of less than 5%. A water-diluted drop of the granule slurry under test is spread on a microscope slide and as soon as movement of the granules has stopped, a field containing at least ten granules is selected for measurement. The diameter of the chosen graules which should be roughly of the order to 10–20 micron, is measured while they are still wet using a microscope with a calibrated eyepiece and a magnification of about 400 ×. The field is kept under observation and the same granules re-measured 2–3 minutes after they are seen to have dried out. At least ten granules should be measured and the shrinkage, calculated as percentage reduction in diameter on drying, averaged out.

We have now found that vesiculated granules of cross-linked polyester resin can be prepared in the form of an aqueous slurry, the granules of which are dimensionally stable, provided the components thereof are selected in the particular manner hereinunder described.

According to the present invention we now provide a process of preparing an aqueous slurry of dimensionally stable vesiculated cross-linked polyester resin granules wherein:

(1) droplets of water are dispersed in a solution of a carboxylated unsaturated polyester resin which has an acid value of 10–45 mgm KOH per gm in ethylenically unsaturated monomer copolymerisable therewith and which has a solubility in water at 20° C of less than 5% by weight and in the presence of a water-soluble polyamine which contains at least three amine groups per molecule and which has a dissociation constant in water (pKa value) of 8.5–10.5, at a concentration such that there are 0.3 to 1.4 amine groups present per polyester resin carboxyl group, (2) the unsaturated polyester resin solution containing disperse particles of water is stably dispersed as globules in water in the presence of a dispersion stabiliser for the disperse globules, and (3) addition polymerisation is then initiated within the globules which are thereby converted to granules of cross-linked vesiculated polyester resin granules.

If it is required to pigment the vesicles or the polymer of the granules then the desired pigment must be pre-dispersed in the above-described water droplets and polyester resin solution respectively.

In one embodiment of our invention, the first two of the above-described three steps may be effected concurrently. For example, if a solution of carboxylated unsaturated polyester resin in an essentially waterinsoluble unsaturated monomer copolymerisable therewith is added, with agitation, to water containing a colloidal dispersion stabiliser for an oil-in-water type dispersions and in the presence of a water-soluble polyamine as hereinunder defined it will form therein a stable oil-in-water type dispersion of globules of resin solution in the water. At the same time, a suspension of disperse droplets of water forms spontaneously within the globules of resin solution.

Polymerisation is then initiated by known means to cross-link the polyester resin. The globules of resin solution are thereby converted to granules of cross-linked resin within which the water droplets remain as liquid-filled vesicles. If required, the granules can be dried in air, when the entrapped water diffuses out to leave air-filled vesicles within the granules.

When, however, it is required to prepare vesiculated granules with pigment in the vesicles, then a dispersion in water of the desired pigment is first dispersed as droplets in the polyester resin solution and polyamino, by adding the water-pigment dispersion to the resin solution slowly and with agitation, in the conventional manner of preparing water-in-oil type dispersions. The resin solution containing water droplets in which pigment is dispersed is in turn added, with agitation, to water in the presence of a suitable stabiliser, to form disperse globules of the oil-in-water type. When polymerisation is initiated, as described above, pigment remains trapped within the aqueous vesicles of the cross-linked polymer granules so-formed. The water need not, of course, contain pigment unless pigment is required in the vesicles of the completed granules.

The oil-in-water type dispersion, the globules of which are themselves water-in-oil type emulsions before polymerisation is carried out, can be stabilised by conventional means. We have found it desirable to use a colloidal dispersion stabiliser in solution in the water which provides the continuous phase of the oil-in-water type dispersion. this is a well-known practice in forming stable oil-in-water type dispersions. The most satisfactory material is a water-soluble partially hydrolysed poly(vinyl acetate) with a molecular weight of about 100,000. The degree of hydrolysis is preferably 85-90%.

If insufficient dispersion stabiliser is used the suspension formed may be unstable, while if an excess is used complete emulsification of the components with loss of the discrete globules of polyester resin solution may take place. As a general guide we have found that a concentration of the order of 0.1-1.0% by weight of the poly(vinyl acetate) in the aqueous continuous phase usually give satisfactory results.

It is sometimes useful to increase the viscosity of the water phase further in order to aid the formation of globules of disperse phase, by the addition to it of water-soluble polymeric thickeners. Suitable materials of this type are the soluble ethers of cellulose, especially hydroxy-ethyl-cellulose.

Carboxylated unsaturated polyester resins which will cross-link by reaction with polymerisable monomers are well-known. The degree of carboxylation, as measured by the acid value of the resin, is not particularly critical for the purpose of this invention. For example, although resins with acid values below 10 mgm KOH per gm or higher than 50 mgm KOH per gm may, under appropriate conditions, yield vesiculated polyester granules, in general we have found it advisable to select unsaturated polyester resins which have acid values of from 10 to 45 mgm KOH per gm. Preferably the acid value should be within the range of 17-25 mgm KOH per gm.

The polyester resins from which a selection is made are condensation products of polybasic acids (or the corresponding anhydrides) and dihydric alcohols. Polymerisable unsaturation is introduced into the molecule by the selection of an $\alpha\text{-}\oplus$-ethylenically unsaturated acid, optionally in combination with a saturated acid or anhydride.

Thus suitable acids are, for example: unsaturated aliphatic acids, e.g. maleic, fumaric, itaconic, citraconic and mesaconic acids; saturated aliphatic acids, e.g. malonic, succinic, glutaric, adipic, pimelic, azelaic, tetrahydrophthalic, chlorenndic and sebacic acids; and saturated aromatic acids, e.g. phthalic, isophthalic, terephthalic, tetrachlorophthalic, trimellitic and trimesic.

Suitable dihydric alcohols are chosen from, for example, ethylene glycol, poly(ethylene glycols) e.g. diethylene glycol, hexane 1, 6-diol, propylene glycol, dicyclohexanol and neopentyl glocyl. Alternatively the alcohol may be one which initially contained three or more hydroxyl groups in excess of two optionally being at least in part etherified with, for example, a monohydric alcohol e.g. methanol, ethanol and n-butanol or esterified with a monobasic acid, e.g. benzoic acid, p tert.-butyl benzoic acid and chain-like aliphatic acid of up to 18 carbon atoms. chain length e.g. coconut oil monoglyceride.

The methods by which unsaturated polyesters of this type are formulated and made are well known in the art.

Optionally the polyester resin solution may be pigmented, i.e. pigment may be dispersed therein in a conventional manner to obtain special physical effects, e.g. to increase the inherent opacifying effect of the granules or to obtain colour effects. The pigmentation chosen must be water-insoluble and the addition of materials known to prevent free radical polymerisation avoided. As described above, pigment may also be introduced into the vesicles.

The unsaturated monomer in which the unsaturated polyester resin is dissolved and cross-linked must be essentially water-insoluble. Monomers which have a solubility at 20° C of less than 5% (w/w) in water are considered to be suitably water-insoluble for our purpose. A single monomer or a mixture of monomers may be used and in general the monomer will contain only a single polymerisable double bond. However, it is known that poly-functional monomers, that is monomers containing more than one polymerisable double bond, are also used to cross-link unsaturated polyester resins. Such polyfunctional monomers are, however, normally present only as a minor constituent of a mixture of monomers, the major proportion of which is monofunctional monomer. Hence mixtures comprising e.g. divinyl benzene may be used in the performance of our invention.

The preferred ethylenically unsaturated monomers for general use in our process are selected from styrene, 'vinyl toluene' and methyl methacrylate, because of the ease with which they can be copolymerised with the unsaturated polyester resin. For the best results, we prefer that the monomer shall comprise at least 50% by weight of styrene.

The choice of monomer is not, however, restricted to the above monomers alone. Bearing in mind the requirements that the total monomer must be essentially insoluble in water and also be a solvent for the unsaturated polyester resin, there may be present in a minor proportion other polymerisable unsaturated monomers to, for example, modify the physical properties of the co-reacted resins. Typical co-monomers are, for example, ethyl acrylate, n-butyl methacrylate, acrylonitrile, and triallyl cyanurate. In general, we have found that the upper limit of usefulness of such monomers in 10% by weight based on the total monomer used. Higher concentrations give granules which are either too brittle or too rubbery to be used effectively in paints.

Optionally a few percent by weight of a nonpolymerising organic liquid, e.g. n-butanol or toluene, may be mixed with the monomer to increase the solubility of the polyester resin therein or may be introduced as an incidental part of the process, e.g. in preparing the polyester.

The water-soluble polyamine must contain at least three amine groups, which may be primary, secondary or tertiary amine groups and must have a dissociation constant in water (pKa value) within the range of 8.5–10.5. If more than one type of amine group is present in the molecule then the relevant pKa value is that of the most basic amine group.

Suitable polyamine compounds are, for example diethylene triamine, triethylene tetramine and oligomers of vinyl pyridine or dimethylaminoethylmethacrylate with polyethylene glycol methacrylate or mixtures thereof.

Polymerisation within the globules is brought about by a free radical initiator, e.g an organic peroxide or by exposure to a radiation source such as radio-active cobalt or ultra-violet radiation. When an organic source of free radicals is used this is conveniently introduced into the reactants by dissolving it in the monomer or polyester solution before the globule suspension is prepared. The free radical source is then activated by e.g. heating to its decomposition temperature. Alternatively, a redox process using e.g. diethylaniline as an activator may be used. We have found that a particularly useful initiation system is to use a combination of diethylenetriamine and cumene hydroperoxide which is triggered by ferrous ions. This permits virtually all of the reactants to be dispersed into their required form and particle size under stable, no-polymerising conditions followed by simple initiation, when requied, of the polymerisation process. The vesiculated granules so-formed may subsequently be mechanically separated from the aqueous continuous phase and dried or they may be incorporated as an aqueous slurry directly into suitable aqueous compositions. In either case, loss of water from the granules ultimately provides essentially air-filled vesicles; in which form they exert their maximum opacifying effect.

By the process of this invention vesiculated granules of from 0.1 to 500 micron diameter may be prepared and with vesicle diameters ranging from 0.01 to 5.0 micron. The maximum achievable diameter of granules is not limited to 500 micron, however, and for special purposes granules of up to 2-3mm diameter can be prepared by control of the initial globule size. Each granule will, on average, contain more than one vesicle and when the granules are intended for use as opacifying agents the vesicles, which may occupy from 65 to 80% by volume of the granule, should have diameters within the range of 0.015 to 5.0 micron, preferably 0.03 to 1.0 micron.

Although the granules prepared according to this invention may be used for a variety of purposes, for example as low-density fillers and opacifiers in plastic mouldings, polymer films and paper, they are particularly useful as opacifiers and matting agents for aqueous latex paints. Thus a typical aqueous latex paint will consist of a latex vehicle, pigment and certain auxiliary materials such as fungicides and stabilisers. By a latex vehicle we mean a stable dispersion in an aqueous liquid of particles of film-forming polymer which, when the vehicle is allowed to dry in air as a thin film on a substrate, coalesces to form a polymeric paint film in which the other solid constituents of the paint are embedded. It is in a latex paint such as this that the aqueous slurry of granules of our invention are particularly useful. The aqueous slurry may be added directly to the remaining constituents of the paint. The vesiculated granules persist as discrete particles in a dried film prepared from the paint composition. Because at least part of the liquid trapped in the vesicles diffuses out of them as the paint film dries, and thus provides vapour-filled vesicles, the granules can function in the dry film as both matting and opacifying agents.

It has been observed that when vesiculated polyester resin granules available hitherto are introduced into an aqueous latex paint as a slurry and a dried film thereof is prepared on a substrate, there is a tendency for the paint film to crack on drying. When relatively high pigment and/or granule concentrations are present in the paint film, the degree of cracking can represent a serious defect in the paint. It is a particularly important feature of our invention that when vesiculated polyester granules slurries of the prior art are replaced by granule slurries of this invention, in which the individual granules have a demonstrably markedly increased dimensional stability, the above defects are avoided.

The aqueous slurries may be incorporated into the latex paint by stirring them into a base comprising a homogeneous blend of the other constituents of the formula.

The invention is illustrated by the following examples, in which all parts are expressed by weight;

EXAMPLE 1

Preparation of dimensionally stable vesiculated cross-linked polyester resin granules having a diameter of approximately 30 micron.

A polyester resin made from phthalic anhydride, fumaric acid and propylene glycol (mole ratios 1:3 : 4.4) was dissolved in styrene to a concentration of 70% by weight. The solution had a Gardner-Holdt viscosity of $Z_3$. The acid value of the solid polyester resin was 22.0 mg. KOH per gm.

A colloid solution A was prepared by dissolving 1.8 parts of a fast-dissolving grade of hydroxyethyl cellulose in 326.2 parts of water and a colloid solution B was prepared by dissolving 7.5 parts of a poly(vinyl alcohol/vinyl acetate) in 92.5 parts of water. The poly (vinyl alcohol vinyl acetate) was a partially hydrolysed poly (vinyl acetate) of approx. wt. average molecular weight 125,000, 87–89% hydrolysed and with a viscosity (as a 4% wt. aqueous solution at 20° C) of 35–45 centipoise.

The following ingredients were mixed:

| | |
|---|---|
| polyester resin solution (as above) | 91.0 parts |
| styrene | 45.5 parts |
| diethylenetriamine | 0.9 parts |
| benzoyl peroxide (50% active constituent in plasticiser) | 7.5 parts |

The resulting homogeneous liquid was added, with constant mechanical agitation, to a mixture of:

| | |
|---|---|
| colloid solution B | 90.0 parts |
| colloid solution A | 328.0 parts |
| diethylenetriamine | 0.3 parts |

Globules of disperse resin solution formed and the mixture was stirred vigorously until the globule size was 30 micron maximum. The stirring rate was then reduced and the following mixture added:

| | |
|---|---|
| water | 100.0 parts |
| diethylaniline | 1.5 parts |

The resulting polymerisation reaction leading to cross-linking of the polyester resin was detected by the resultant exotherm. The granules which formed were of about 30 micron maximum diameter and were observed to contain aqueous vesicles of about 1 micron diameter. When examined by transmitted light under a microscope the granules appeared translucent and brown, but as they dried out they became opaque. The degree of vesiculation was estimated to be about 70% by volume and the shrinkage, determined as hereinabove described, was less than 5%.

EXAMPLE II

Preparation of dimensionally stable vesiculated cross-linked polyester resin granules of about 20 micron max. diameter, in which the vesicles contained pigment particles.

An aqueous mill-base was prepared by blending together the following ingredients with a mechanical stirrer:

| | |
|---|---|
| titanium dioxide pigment | 208.0 parts |
| sodium hexametaphosphate | 0.8 parts |
| water | 104.0 parts |

A water-in-oil type emulsion was prepared by vigorously stirring a mixture of 170 parts of aqueous mill-base and 0.9 parts of diethylenetriamine into a mixture of 91.0 parts of polyester resin solution (as example 1) and 45.5 parts of styrene, to which was then added 7.5 parts of a 50% by wt. paste of benzoyl peroxide in a plasticiser liquid.

This emulsion was then immediately poured into a mixture of:

| | |
|---|---|
| colloid solution A | 328.0 parts |
| colloid solution B | 90.0 parts |

(as per example 1) and stirred vigorously until the particle size of the disperse globules was about 20 micron dia. maximum. The stirring rate was then reduced and 1.5 parts of diethylaniline added.

The batch was allowed to exotherm as the disperse resin solution polymerised to cross-linked polyester resin granules, which had a vesicle content of approximately 70% by volume. Examination of fractured granules with a scanning electron microscope confirmed the presence of pigment particles within the vesicles. The granules had a shrinkage of 4% when tested as hereinabove described.

EXAMPLE III

Effect of selection of amine on the characteristics of the disclosed process of preparing vesiculated polyester resin granules.

An attempt was made to prepared a series of granules by the general method of example II but replacing the 170 parts of aqueous mill-base of that example by 80 parts of water, and using the amine bases shown in the following table.

It will be observed from the table that the bases, as used in the process, fell into four groups:
(1) Virtually water-insoluble. No first (water-in-oil type) emulsion could be prepared;
(2) Water-soluble but an unstable first emulsion was formed. No granules formed.
(3) Vesiculated granules formed but with poor dimensional stability.
(4) Polyamine base according to the invention. Good granules.

It will be observed that the amine bases which produced satisfactory granules were water-soluble, had a pKa value of 8.5–10.5 and were polyamines as hereinabove defined.

| Amine | Rel. W. Sol | pKa | Shrinkage | Comment |
|---|---|---|---|---|
| aniline | insoluble | 4.7 | — | No first emulsion |
| o-toluidine | insoluble | 6.0 | — | " |
| o-phenylene diamine | insoluble | — | — | " |
| dodecylene diamine | insoluble | 11.8 | — | " |
| DMAEMA* | high | 5.4 | — | unstable emulsion |
| vinyl pyridine | low | 5.4 | — | " |
| ammonia | high | 9.3 | 12 | coarse vesiculation |
| triethanolamine | high | 9.5 | 14 | " |
| diethylamine | high | 10.5 | 13 | " |
| ethylamine | high | 10.8 | 12 | " |
| ethylene diamine | high | 10.8 | 7 | " |
| triethylamine | high | 11.1 | 13 | " |
| triethylene tetramine | high | 9.5 | 2 | fine vesiculation |
| diethylene triamine | high | 9.8 | 4 | " |
| Amine C+ | medium | 9.0 | 5 | medium vesiculation |
| Amine D+ | medium | 9.5 | 3 | " |

*DMAEMA - dimethylaminoethylmethacrylate.
+Amines C and D were two copolymers of 2-ethoxy ethanol methacrylate (2 EEM) poly (ethylene glycol) methacrylate (PEGM) and specific amines, in the following molar ratios:
  Amine C : vinyl pyridine/2EEM - 50/50
  Amine D : DMAEMA/PEGM - 50/50

The bead slurries were blended with aqueous latex and pigment to give an aqueous latex paint of the following weight composition (on non-volatile content):

These paints were cast onto a porous substrate using a 200 micron applicator and allowed to dry in air.

All of the paints based on granules which had a shrinkage of greater than 5% showed unacceptable cracking.

EXAMPLE IV

Effect of polyamine level on dimensional stability of granules of vesiculated polyester polymer.

A series of vesiculated polyester resin granules was prepared by the general method of example 1 but varying the polyamine level as shown in the accompanying table.

The shrinkage of the granules was then determined by the above — described test method and as the results show, dimensional stability of the granules is critically dependent on the mole ratio of amine base/carboxyl group and falls of sharply at a ratio of about 1.5.

| Polyamine | Mol amine/carboxyl | Shrinkage % |
|---|---|---|
| diethylenetriamine | 0.30 | 3 |
| | 0.45 | 3 |
| | 0.70 | 3 |
| | 1.10 | 4 |
| | 1.30 | 5 |
| | 1.60 | 11 |
| triethylenetetramine | 1.00 | 2 |
| | 2.00 | 11 |
| amine D polymer (example III) | 1.00 | 5 |
| | 1.50 | 8 |

EXAMPLE V

Effect of acid value of the polyester resin on some properties of vesiculated granules prepared therefrom.

A series of vesiculated polyester resin granules was prepared from a range of polyester resins by the general method of example 1, but varying the concentration of polyamine according to the acid value of the resins used to keep the mole ratio of amine/carboxyl group constant. The resins were all of the same basic composition as that of example 1 but were processed to the acid values given in the accompanying table. The shrinkage of the granules was measured as described hereinabove.

| ACID VALUE + | SHRINKAGE % |
|---|---|
| 10 | 3 |
| 20 | 2 |
| 30 | 2 |
| 40 | 3 |
| 47 | 3 |

+ mgm kOH per gm of solid resin.

Thus, there was little difference in the dimensional stability of the granules prepared from resins having acid values from 10 to 47. However, at lower and higher acid values, the stability of the dispersion of gloubles of polyester resin prior to the cross-linking reaction was inadequate to permit the formation of satisfactory crosslinked vesiculated granules of high opacity.

EXAMPLE VI

Preparation of a slurry of granules by the general method of example II but using a liquid catalyst system.

A water-in-oil type emulsion was prepared by vigorously slurring a mixture of 170 parts of aqueous mill base according to example II and 0.9 parts of diethylenetriamine into a mixture of 91.0 parts of polyester resin (as example II) and 45.5 parts of styrene.

This emulsion was then immediately poured into a mixture of:

| colloid solution A | 328.0 parts |
|---|---|
| colloid solution B | 90.0 parts |
| 70% cumene hydroperoxide | 2.2 parts | and stirred vigorously until the particle size of the disperse globules was about 20 micron dia. maximum. The stirring rate was reduced and 50.0 parts of water, 0.3 parts of diethylene triamine and 0.02 parts of ferrous sulphate before hydrate was added.

Stirring was then stopped and the batch allowed to exotherm as the disperse resin solution polymerised. The resulting polyester resin granules had a vesicle content of approximately 70% by volume. Examination of fractured granules with a scanning electron microscopeconfirmed the presence of pigment particles within the vesicles. The granules had a shrinkage of 4% when tested as hereinabove described.

EXAMPLE VII

Use of methyl methacrylate monomer.

Example VI was repeated but replacing the 45.5 parts of styrene with an equal weight of methyl methacrylate. Granules of similar characteristics to those of example VI were produced.

When an attempt was made to prepare similar granules but replacing all of the styrene of example VI with methyl methacrylate, it was found that the rate of polymerisation was unacceptably slow.

We claim:

1. An aqueous slurry of vesiculated cross-linked polyester resin granules which are dimensionally stable in that the shrinkage of a water-wet granule on drying out and measuring by microscope examination is less than 5% and which have a vesicle volume of 65–80% of the total granule volume, the cross-linked polyester being the product of a carboxylated unsaturated polyester resin which has an acid value of 10–45 mgm KOH per gm cross-linked with ethylenically unsaturated monomer copolymerisable therewith and which has a solubility in water at 20° C of less than 5% by weight, said slurry also including a water-soluble polyamine which contains at least three amine groups per molecule and which has a dissociation constant in water (pKa value) of 8.5–10.5, at a concentration such that there are 0.3 to 1.4 amine groups present per polyester resin carboxyl group before said resin in crosslinked.

2. An aqueous slurry according to claim 1 including a dispersion stabiliser.

3. An aqueous slurry according to claim 2 wherein the granules include pigment therein.

4. An aqueous slurry according to claim 2 wherein the stabiliser is an 85–90% hydrolysed grade of poly(vinyl acetate).

5. An aqueous slurry according to claim 4 wherein the carboxylated unsaturated polyester resin has an acid value of 17–25 mgm KOH per gm.

6. An aqueous slurry according to claim 5 wherein the ethylenically unsaturated monomer is at least one material selected from styrene, vinyl toluene and methy methacrylate.

7. An aqueous slurry according to claim 6 wherein the ethylenically unsaturated monomer comprises at least 50% by weight styrene.

* * * * *